(12) United States Patent
Park et al.

(10) Patent No.: US 10,556,337 B2
(45) Date of Patent: Feb. 11, 2020

(54) METHOD OF AND APPARATUS FOR MANAGING BEHAVIOR OF ROBOT

(71) Applicant: HANWHA PRECISION MACHINERY CO., LTD., Changwon-do (KR)

(72) Inventors: Jong Hwa Park, Changwon-si (KR); Byung Hoon Lee, Changwon-si (KR); Hyung Suk Lee, Changwon-si (KR)

(73) Assignee: HANWHA PRECISION MACHINERY CO., LTD., Changwon-si (KR)

( * ) Notice: Subject to any disclaimer, the term of this patent is extended or adjusted under 35 U.S.C. 154(b) by 240 days.

(21) Appl. No.: 15/494,767

(22) Filed: Apr. 24, 2017

(65) Prior Publication Data

US 2018/0154517 A1    Jun. 7, 2018

(30) Foreign Application Priority Data

Dec. 6, 2016  (KR) .......................... 10-2016-0165174

(51) Int. Cl.
*G06F 19/00*  (2018.01)
*B25J 9/16*   (2006.01)

(52) U.S. Cl.
CPC .............. *B25J 9/161* (2013.01); *B25J 9/1671* (2013.01); *G05B 2219/33051* (2013.01); *G05B 2219/40099* (2013.01)

(58) Field of Classification Search
CPC ................... B25J 9/161; B25J 9/1671; G05B 2219/33051; G05B 2219/40099
See application file for complete search history.

(56) References Cited

U.S. PATENT DOCUMENTS

| 9,981,380 | B2* | 5/2018 | Setsuda | B25J 9/1679 |
| 2006/0111812 | A1* | 5/2006 | Okamoto | B25J 5/007 700/214 |
| 2011/0190938 | A1* | 8/2011 | Ekelund | G05B 19/409 700/264 |
| 2012/0072023 | A1* | 3/2012 | Ota | B25J 9/1664 700/259 |
| 2014/0282935 | A1* | 9/2014 | Lal | G06F 21/72 726/6 |
| 2014/0288711 | A1* | 9/2014 | Sawada | B25J 9/1697 700/259 |
| 2014/0337775 | A1* | 11/2014 | Northrup | G06F 8/34 715/770 |
| 2015/0183112 | A1* | 7/2015 | Song | B25J 9/16 700/245 |

(Continued)

FOREIGN PATENT DOCUMENTS

| KR | 2002-0061186 A | 7/2002 |
| KR | 10-1190660 B1 | 10/2012 |

(Continued)

*Primary Examiner* — Ian Jen
(74) *Attorney, Agent, or Firm* — Sughrue Mion, PLLC (57) ABSTRACT

A method of controlling a robot includes: generating a plurality of behavior objects corresponding to a plurality of behaviors to be performed by the robot; calculating an expected time expected to be taken by the robot to perform each of the behaviors; mapping each of the behavior object to the expected time; adding the behavior objects to a behavior flow list; and displaying the behavior flow list.

18 Claims, 8 Drawing Sheets

(56) References Cited

U.S. PATENT DOCUMENTS

2016/0162671 A1* 6/2016 Baca .................. G06F 21/32
                                                    382/115
2016/0259717 A1* 9/2016 Nychis ............... G06F 11/0706
2016/0284232 A1* 9/2016 Sisamos ............ G05B 19/0426
2019/0279070 A1* 9/2019 Hayashi ................... G06T 7/60

FOREIGN PATENT DOCUMENTS

KR      10-1283667  B1    7/2013
KR    10-2015-0041333 A   4/2015

* cited by examiner

METHOD OF AND APPARATUS FOR MANAGING BEHAVIOR OF ROBOT

CROSS-REFERENCE TO THE RELATED APPLICATION

This application claims priority from Korean Patent Application No. 10-2016-0165174, filed on Dec. 6, 2016, in the Korean Intellectual Property Office, the disclosure of which is incorporated herein in its entirety by reference.

BACKGROUND

1. Field

Apparatuses and methods consistent with the exemplary embodiments of the inventive concept relate to managing a behavior of a robot.

2. Description of the Related Art

With the rapid advancement of technology, robots have replaced humans and play important roles as tools for performing various tasks. Robots can automatically perform a variety of tasks such as supplying, assembling, welding, and painting on production lines of manufactories in a similar manner to human arms, but with improved productivity.

In general, a plurality of robots are simultaneously used in an automated process. Accordingly, a technology of more efficiently setting behaviors of individual robots is required.

SUMMARY

One or more exemplary embodiments include a method of and apparatus for managing a behavior of a robot, whereby a current behavior that is being performed from among all behaviors of the robot and a progress of the current behavior may be rapidly recognized.

One or more exemplary embodiments include a method of and apparatus for managing a behavior of a robot, whereby sequential behaviors of the robot may be conveniently and intuitively changed through a graphical user interface (GUI).

One or more exemplary embodiments include a method of and apparatus for managing a behavior of a robot, whereby a sub-behavior is displayed or not displayed on a screen according to need so that a main behavior is displayed on the screen in a highlighted manner, and the sub-behavior that is necessary is displayed without being missed.

Various aspects will be set forth in part in the description which follows and, in part, will be apparent from the description, or may be learned by practice of the presented exemplary embodiments.

According to one or more exemplary embodiments, there is provided a method of managing a behavior of a robot includes: generating a plurality of behavior objects corresponding to a plurality of behaviors to be performed by the robot, respectively; adding the behavior objects to a behavior flow list; and displaying the behavior flow list.

The method may further include, when the robot performs the behaviors based on the behavior flow list, updating the display of the behavior flow list based on a progress degree of the behaviors performed by the robot.

The updating the display of the behavior flow list may include displaying a progress bar corresponding to the progress degree on the displayed behavior flow list.

At least one of the behaviors may include one or more sub-behaviors, wherein the generating a plurality of behavior objects includes generating a sub-behavior object corresponding to each of the one or more sub-behaviors, and the adding the behavior objects to a behavior flow list includes adding the sub-behavior object corresponding to each of the one or more sub-behaviors to the behavior flow list.

The updating the display of the behavior flow list may further include: determining, based on the progress degree, whether a current behavior that is being currently performed comprises sub-behaviors; and when it is determined that the current behavior comprises the sub-behaviors, displaying sub-behavior objects corresponding to the sub-behaviors along with a behavior object of the current behavior.

The displaying sub-behavior objects may include: displaying a sub-behavior object corresponding to a current sub-behavior that is being currently performed according to a first display format; and displaying sub-behavior objects other than the sub-behavior object corresponding to the current sub-behavior, according to a second display format.

The behavior object corresponding to the current behavior may be displayed according to a third display format.

The updating the display of the behavior flow list may include deleting the sub-behavior objects corresponding to the sub-behaviors of the current behavior when the current behavior ends.

The generating a plurality of behavior objects may include selecting the behavior objects based on a user's input from a list of behavior objects available in a system to control the robot.

The generating a plurality of behavior objects may include generating the behavior objects by referring to a series of instruction codes.

The method may further include: calculating an expected time expected to be taken by the robot to perform each of the behaviors; mapping each of the behavior objects to the expected time. At least one of the behaviors may include one or more sub-behaviors, wherein the generating a plurality of behavior objects includes generating a sub-behavior object corresponding to each of the one or more sub-behaviors, and the calculating the expected time includes calculating an expected time expected to be taken to perform each of the one or more sub-behaviors. The updating the display of the behavior flow list may include: measuring an actual time actually taken by the robot to perform a behavior corresponding to a behavior object included in the behavior flow list; and updating the expected time mapped to the behavior object to the actual time.

The updating the display of the behavior flow list may include displaying at least one of the expected time and the actual time along with the behavior objects included in the behavior flow list.

According to one or more exemplary embodiments, there is provided an apparatus for controlling a robot which may include a controller configured to: generate a plurality of behavior objects corresponding to a plurality of behaviors to be performed by the robot, respectively; add the behavior objects to a behavior flow list; and generate display data of the behavior flow list.

The controller may be further configured to, when the robot performs the behaviors based on the behavior flow list, update the display data of the behavior flow list based on a progress degree of the behaviors performed by the robot.

The controller may be further configured to update the display data of the behavior flow list such that a progress bar corresponding to the progress degree is indicated in the behavior flow list.

At least one of the behaviors may include one or more sub-behaviors, wherein the controller is further configured to: generate a sub-behavior object corresponding to each of the one or more sub-behaviors; and add the sub-behavior object corresponding to each of the one or more sub-behaviors to the behavior flow list.

The controller may be further configured to: determine, based on the progress degree, whether a current behavior that is being currently performed includes sub-behaviors; and when it is determined that the current behavior comprises the sub-behaviors, update the display data of the behavior flow list such that sub-behavior objects corresponding to the sub-behaviors are displayed along with a behavior object of the current behavior.

The controller may be further configured to update the display data of the behavior flow list such that: a sub-behavior object corresponding to a current sub-behavior that is being currently performed according to a first display format; sub-behavior objects other than the sub-behavior object corresponding to the current sub-behavior according to a second display format; and the behavior object corresponding to the current behavior according to a third display format.

The controller may be further configured to: calculate an expected time expected to be taken by the robot to perform each of the behaviors, and map each of the behavior objects to the expected time. At least one of the behaviors may include one or more sub-behaviors, when the controller may be further configured to generate a sub-behavior object corresponding to each of the one or more sub-behaviors, and calculate an expected time expected to be taken to perform each of the one or more sub-behaviors. The controller may be further configured to measure an actual time actually taken by the robot to perform a behavior corresponding to a behavior object included in the behavior flow list, and update the expected time mapped to the behavior object to the actual time.

The controller may be further configured to update the display data of the behavior flow list such that at least one of the expected time and the actual time is displayed along with the behavior objects included in the behavior flow list.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION OF THE EXEMPLARY EMBODIMENTS

Exemplary embodiments of the inventive concept will be now described in detail in reference to accompanied drawings. However, this is not intended to limit the exemplary embodiments to particular modes of practice, and it is to be appreciated that all changes, equivalents, and substitutes that do not depart from the spirit and technical scope of the inventive concept are encompassed in the inventive concept. In the description of the exemplary embodiments, certain detailed explanations of the related art are omitted when it is deemed that they may unnecessarily obscure the essence of the inventive concept.

While such terms as "first", "second", etc., may be used to describe various components, such components must not be limited to the above terms. The above terms are used only to distinguish one component from another.

The terms used in the present specification are merely used to describe the exemplary embodiments, and are not intended to limit the inventive concept. An expression used in the singular encompasses the expression of the plural, unless it has a clearly different meaning in the context. In the present specification, it is to be understood that the terms such as "including", "having", and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The exemplary embodiments may be described in terms of functional block components and various processing steps. Such functional blocks may be realized by any number of hardware and/or software components configured to perform the specified functions. For example, these components may employ various integrated circuit (IC) components, e.g., memory elements, processing elements, logic elements, look-up tables, and the like, which may carry out a variety of functions under the control of one or more microprocessors or other control devices. Similarly, where these components are implemented using software programming or software elements, the exemplary embodiments may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the exemplary embodiments could employ any number of conventional techniques for electronics configuration, signal processing and/or control, data processing and the like. The words "mechanism", "element", "means", and "configuration" are used broadly and are not limited to mechanical or physical embodiments, but may include software routines in conjunction with processors, etc.

As used herein, the term "and/or" includes any and all combinations of one or more of the associated listed items. Expressions such as "at least one of," when preceding a list of elements, modify the entire list of elements and do not modify the individual elements of the list.

Figure 1:
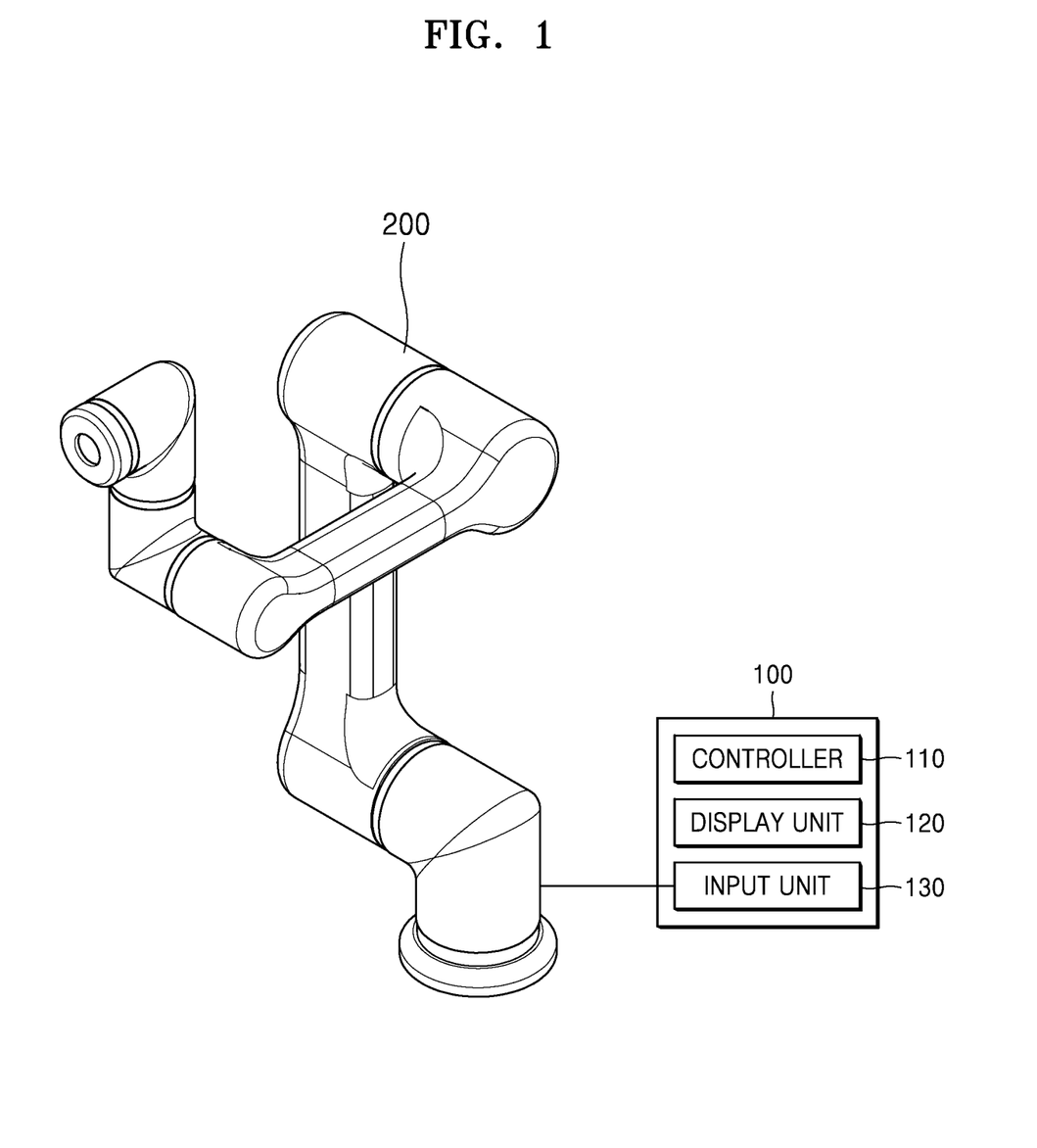
FIG. 1 is a view of a robot system according to an exemplary embodiment.

FIG. 1 is a view of a robot system according to an exemplary embodiment.

Referring to FIG. 1, the robot system according to an exemplary embodiment may include a robot 200 and an apparatus 100 for managing a behavior of the robot 200.

The robot 200 may be a device including one or more actuators, one or more parts, and a control device for controlling the one or more actuators.

In this case, the term 'actuator' may refer to any of various devices for converting electrical energy into kinetic energy based on a control signal. For example, the actuator may be any one from among a direct current (DC) servo motor, an alternating current (AC) servo motor, a stepping motor, a linear motor, a hydraulic cylinder, a hydraulic motor, a pneumatic cylinder, and a pneumatic motor.

The term 'part' may refer to a structure for fixing the actuator to a specific position or a structure fixed to the actuator to be movable.

Also, the term 'control device' may refer to any of various devices for generating a control signal for controlling one or more actuators based on a signal received from an external device such as the apparatus 100 as described below. However, the actuator, the part, and the control device are exemplary and are not limited thereto.

The robot 200 according to an exemplary embodiment may be any one from among, for example, an articulated robot, a selective compliance assembly robot arm (SCARA) robot, and a cylindrical robot. The articulated robot may be a robot having one or more joints and parts (or bodies) for connecting different joints. The SCARA robot may be a robot including an arm that operates in a specific plane. The cylindrical robot may be a robot including an arm that has at least one rotary joint and at least one prismatic joint. However, embodiments are not limited thereto. Accordingly, any robot that includes one or more actuators and one or more parts and operates according to a control signal may be the robot 200 according to an exemplary embodiment.

For convenience of explanation, it is assumed in the following description that the robot 200 is an articulated robot having one or more joints and parts for connecting the joints as shown in FIG. 1.

The apparatus 100 according to an exemplary embodiment may include a controller 110, a display 120, and an input interface 130.

In the exemplary embodiment, a behavior of the robot 200 may refer to a response of the robot 200 to an internal and/or external stimulus. Accordingly, the behavior of the robot 200 may refer not only to an operation of the robot 200 according to a program, a source code, and/or a user's input but also to an operation performed by the robot 200 to detect an environment by using a detector (e.g., a sensor) of the robot 200 and to make a determination based on a result of the detection. The behavior of the robot 200 may be defined by the user, and in the present disclosure, a "behavior object" is used to define or distinguish each behavior of the robot 200.

Such a behavior may include one or more sub-behaviors. In this case, the sub-behaviors may refer to individual responses of the robot 200 that constitute the behavior.

For example, it is assumed that when characteristics detected by the detector (not shown) of the robot 200 satisfy a first condition, the robot 200 operates by changing from a first pose to a second pose, and when the characteristics do not satisfy the first condition, the robot 100 operates by changing from the first pose to a third pose. In this case, when the characteristics satisfy the first condition and the robot 200 operates by changing from the first pose to the second pose, it may mean that the robot 200 performs a first sub-behavior, and when the characteristics do not satisfy the first condition and the robot 200 operates by changing from the first pose to the third pose, it may mean that the robot 200 performs a second sub-behavior.

The controller 110 according to an exemplary embodiment may generate a behavior object corresponding to a behavior of the robot 200, and may calculate an expected time expected to be taken by the robot 200 to perform the behavior. Also, the controller 100 may manage a behavior flow list including the behavior object and generate display data of the behavior flow list.

In this case, the controller 110 may include any type of device for processing data, for example, a processor. The term 'processor' may refer to a data processing device embedded in hardware and having physical circuitry to carry out codes or instructions of a program. Examples of the data processing device embedded in the hardware may include, but not limited to, a microprocessor, a central processing unit (CPU), a processor core, a multiprocessor, an application-specific integrated circuit (ASIC), a field programmable gate array, and a combination thereof.

The display 120 according to an exemplary embodiment may display the behavior flow list based on the display data of the behavior flow list generated by the controller 110. Accordingly, the display 120 may be a display device for displaying figures, letters, or images. For example, the display 120 may include any one from among, but not limited to, a cathode ray tube (CRT), a liquid crystal display (LCD), a plasma display panel (PDP), a light-emitting diode (LED), and an organic light-emitting diode (OLED).

The input interface 130 according to an exemplary embodiment may refer to any of various means for obtaining the user's input. For example, the input interface 130 may be a keyboard, a mouse, a trackball, a microphone, a button, or a combination thereof.

Also, the input interface 130 may refer to, but is not limited to, a touch interface for inputting a touch to the display 120.

Although not shown in FIG. 1, the apparatus 100 according to an exemplary embodiment may further include a communication interface (not shown) and memory (not shown).

In this case, the communication interface may be a device including hardware and software needed to transmit/receive a control signal through wired/wireless connection between the apparatus 100 and an external device such as the robot 200.

The memory temporarily or permanently stores data processed by the apparatus 100. The memory may include, but is not limited to, a magnetic storage medium or a flash storage medium.

The apparatus 100 according to an exemplary embodiment may be separated from the robot 200 and/or a robot control device (not shown) as shown in FIG. 1. Alternatively, the apparatus 100 may be included in the robot 200 and/or the robot control device. In other words, the robot 200 and/or the robot control device may perform a method of managing a behavior according to an exemplary embodiment. However, for convenience of explanation, it is assumed in the following description that the apparatus 100 is separately provided as shown in FIG. 1.

The controller 110 according to an exemplary embodiment may generate a behavior object corresponding to a behavior of the robot 200. In this case, the controller 110 may generate a behavior object based on the user's input through the input interface 130. Also, the controller 110 may generate one or more behavior objects by referring to a series of instruction codes.

Figure 2A:
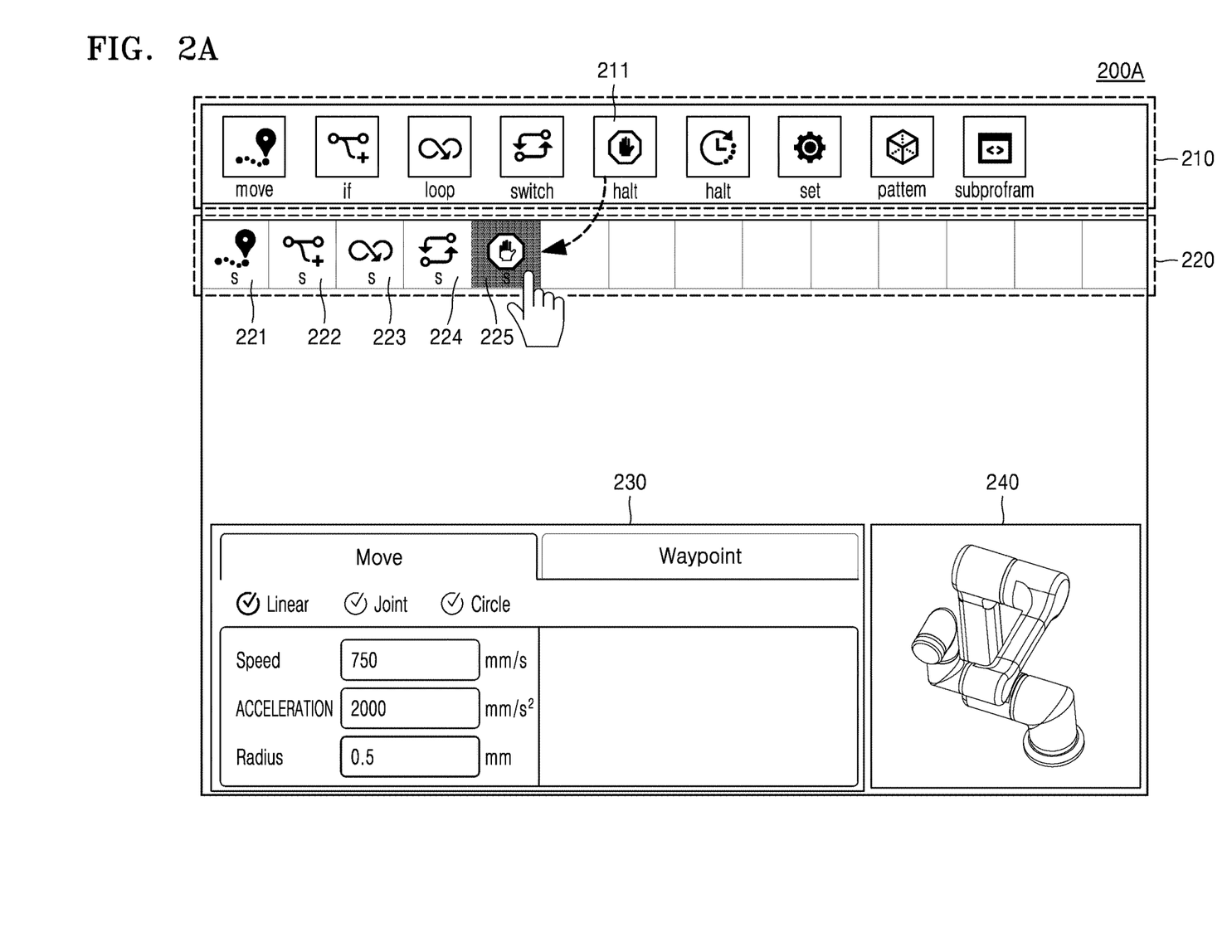
FIG. 2A is a view for explaining a process performed by a controller to generate a behavior object corresponding to a behavior of a robot based on a user's input, according to an exemplary embodiment.

FIG. 2A is a view for explaining a process performed by the controller 110 to generate a behavior object corresponding to a behavior of the robot 200 based on the user's input according to an exemplary embodiment.

First, it is assumed that a screen 200A as shown in FIG. 2A is displayed on the display 120. In this case, the screen 200A may include an area 210 in which behavior objects corresponding to behaviors that may be input by the user or preset in the apparatus 100 for managing a behavior of the robot 200 are displayed, an area 220 in which behavior objects 221 through 225 corresponding to behaviors selected by the user are sequentially displayed, an area 230 in which an interface for setting or changing a specific set value of a selected behavior object is displayed, and an area 240 in which a three-dimensional (3D) image of the robot 200 corresponding to a behavior is displayed.

For example, when it is assumed that the user wants to add the behavior object 211 to the area 220, the user may add the behavior object 225 to the area 220 by selecting the behavior object 211 to be added from the area 210 through the input interface 130 and dragging the behavior object 211 to the area 220. In other words, the behavior object 225 corresponding to a behavior of the robot 200 may be generated by dragging the behavior object 211, from among behavior objects that are provided as examples, to the area 220. In this case, the user may set or change a specific set value of the selected behavior object 225 through the interface displayed in the area 230.

As such, according to an exemplary embodiment, the user may conveniently and intuitively generate or edit sequential behaviors of the robot 200 through a graphical user interface (GUI).

Figure 2B:
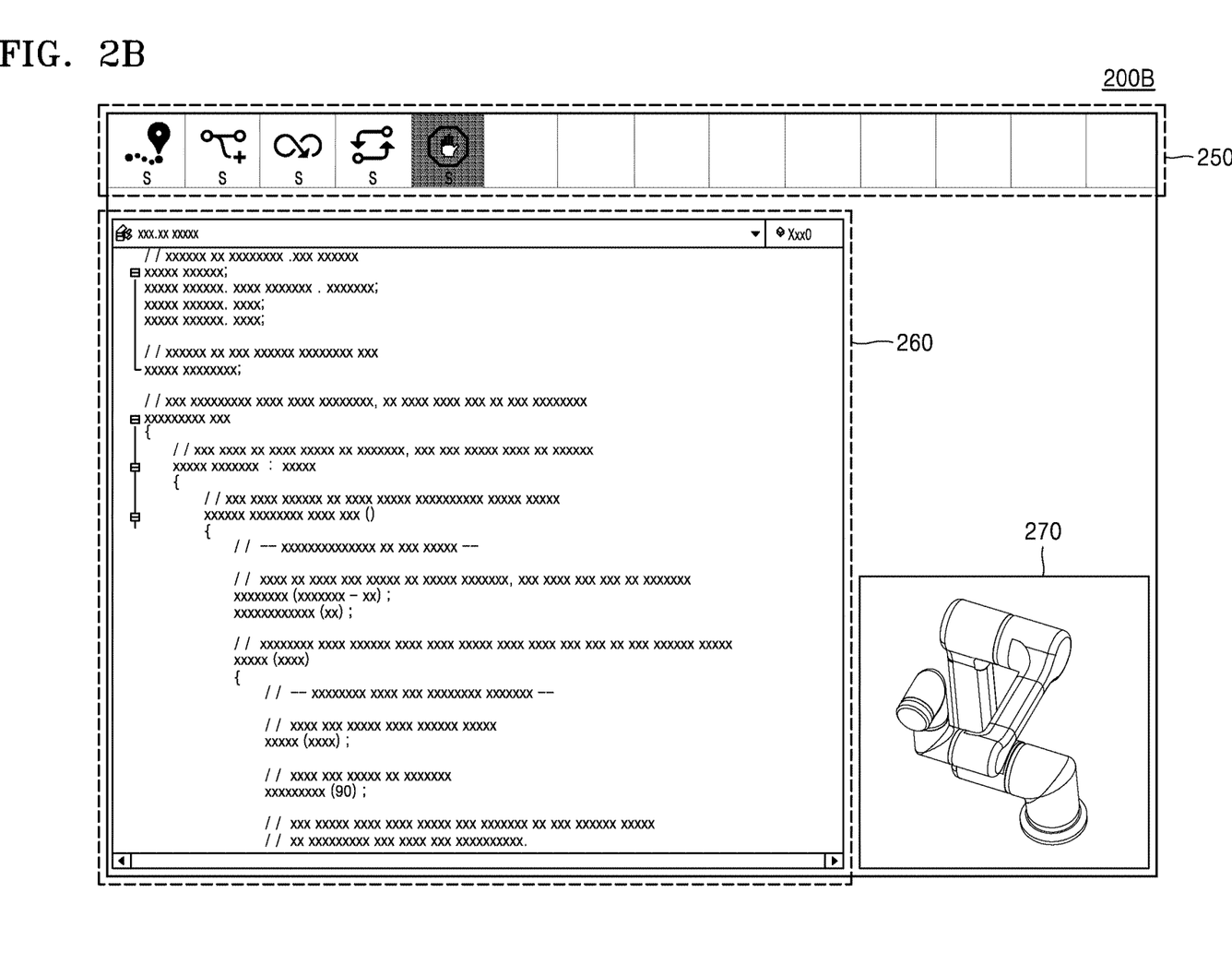
FIG. 2B is a view for explaining a process performed by the controller to generate one or more behavior objects by referring to a series of instruction codes, according to an exemplary embodiment.

FIG. 2B is a view for explaining a process performed by the controller 110 to generate one or more behavior objects by referring to a series of instruction codes, according to an exemplary embodiment.

First, it is assumed that a screen 200B as shown in FIG. 2B is displayed on the display 120. In this case, the screen 200B may include an area 250 in which one or more behavior objects generated by instruction codes are sequentially displayed, an area 260 in which the instruction codes are displayed, and an area 270 in which a 3D image of the robot 200 corresponding to a behavior is displayed.

As such, according to an exemplary embodiment, a behavior of the robot 200 made by using instruction codes may also be visualized.

The controller 110 according to an exemplary embodiment may calculate an expected time expected to be taken by the robot 200 to perform each behavior. For example, the controller 110 may calculate an expected time based on at least one from among an operation speed, an operation acceleration, an operation distance, an operation path, an operation radius, a delay time, and an operation environment of each behavior, not being limited thereto.

The expected time calculated by the controller 110 is literally a time "expected" to be taken by the robot 200 to perform a corresponding behavior, and is not a time actually taken by the robot 200 to perform the behavior. However, the expected time may be updated to an actual time actually taken by the robot 200 to perform the behavior, which will be described below.

The controller 110 according to an exemplary embodiment may map an expected time of each behavior calculated according to the above method to a behavior object corresponding to the behavior. In other words, the controller 110 may control a behavior object of a behavior to correspond to an expected time of the behavior. The expected time corresponding to the behavior object may be displayed along with the behavior object on the display 120 as described below.

The controller 110 according to an exemplary embodiment may add the generated behavior object to a behavior flow list.

In the present disclosure, when "the behavior object is added to the behavior flow list", it may mean that the robot 200 is to perform the behavior at a point of time considering a relative time relationship with one or more other behaviors.

For example, referring back to FIG. 2A, the user may add the behavior object 225 to the area 220, that is, to the behavior flow list, so that the robot 200 is to perform a behavior corresponding to the added behavior object 225 at the end.

The controller 110 according to an exemplary embodiment may generate display data of the behavior flow list, and the display 120 may display the behavior flow list based on the generated display data.

Also, when the robot 200 performs a behavior based on the behavior flow list, the controller 110 according to an exemplary embodiment may update the display data of the behavior flow list based on a progress degree of the behavior of the robot 200. For example, the controller 110 may update the display data such that display data of a progress bar corresponding to the progress degree of the behavior of the robot 200 is further included in the display data of the behavior flow list.

Figure 3A:
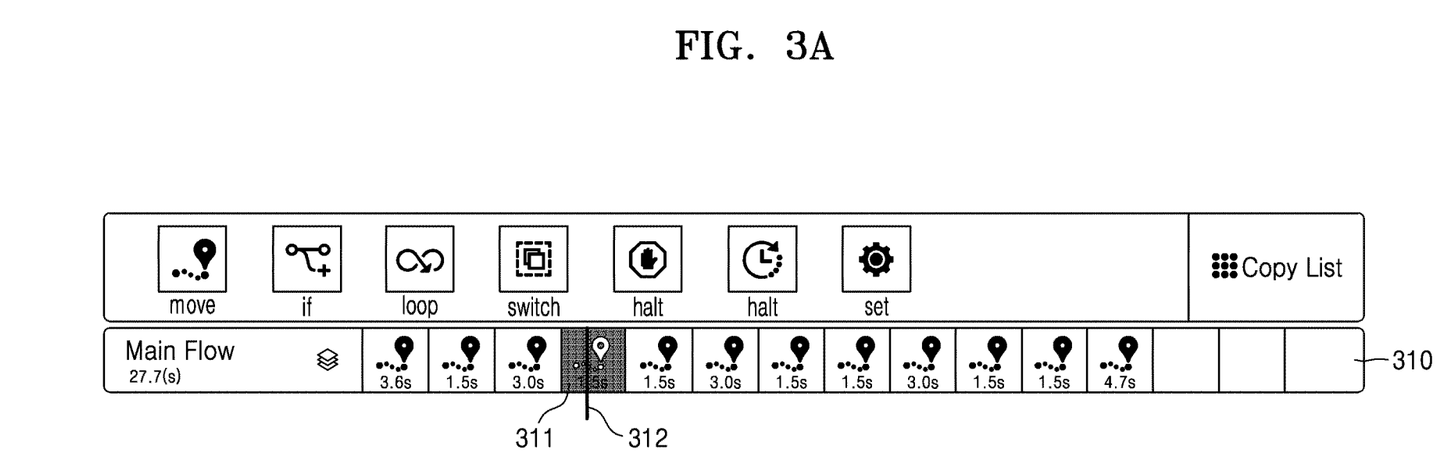
FIGS. 3A through 3C are views illustrating behavior lists displayed on a display when the robot performs a behavior based on each behavior list, according to exemplary embodiments.
Figure 3B:
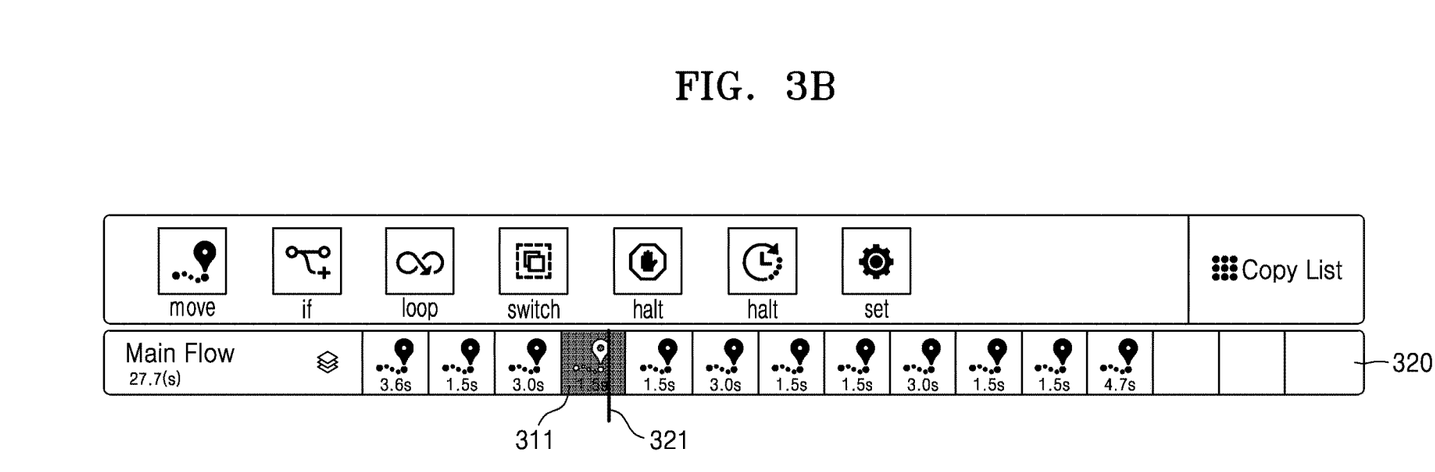
Figure 3C:
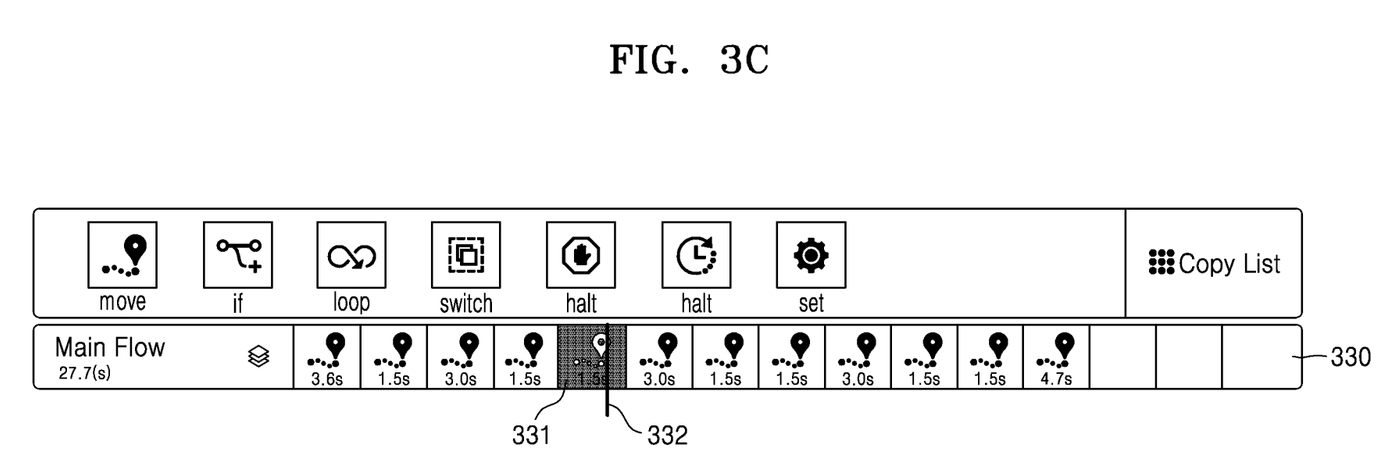

FIGS. 3A through 3C are views illustrating behavior flow lists 310, 320, and 330 displayed on the display 120 when the robot 200 performs behaviors based on each behavior flow list, according to exemplary embodiments.

For example, it is assumed that the robot 200 is performing a behavior corresponding to a behavior object 311 included in the behavior flow list 310 as shown in FIG. 3A.

In this case, the controller 110 may determine a display position of a progress bar 312 based on a progress degree of the behavior corresponding to the behavior object 311 of the robot 200, and may update display data so that display data of the progress bar 312 is further included based on the display position of the progress bar 312. Next, the controller 110 may change a display position of a progress bar 321 based on the progress degree of the behavior corresponding to the behavior object 311 as time passes, and may update the display data so that display data of the progress bar 321 is further included based on the display position of the progress bar 321.

Even when the robot 200 performs a behavior after the behavior corresponding to the behavior object 311 as shown in FIG. 3C, the controller 110 may change a display position of a progress bar 332 based on a progress degree of the behavior, and may update the display data so that display data of the progress bar 332 is further included based on the display position of the progress bar 332.

Also, as shown in FIGS. 3A through 3C, the controller 110 according to an exemplary embodiment may update the display data such that the behavior objects 311 and 331 corresponding to behaviors that are being currently performed are differently displayed from other behavior objects that are not performed.

Accordingly, according to the exemplary embodiments, which behavior is being currently performed from among all behaviors of the robot 200 and how far the behavior that is being currently performed has progressed may be recognized at once.

When a behavior includes one or more sub-behaviors, the controller 110 according to an exemplary embodiment may generate a sub-behavior object corresponding to each of the sub-behaviors. Also, the controller 110 may calculate an expected time expected to be taken to perform each sub-behavior, and may map the sub-behavior to each expected time. Also, the controller 110 may add the sub-behavior object corresponding to each sub-behavior to a behavior flow list. In this case, a process performed by the controller 110 to generate a behavior object, calculate an expected time, map the behavior object to the expected time, and add the behavior object to a behavior flow list is the same as that described above, and thus a detailed explanation thereof will not be given below.

As described above, when the robot 200 performs a behavior based on a behavior flow list, the controller 110 according to an exemplary embodiment may update display data of the behavior flow list based on a progress degree of the behavior of the robot 200. In this case, the controller 110 may determine whether the behavior that is being currently performed by the robot 200 includes a sub-behavior. When the behavior that is being currently performed includes one or more sub-behaviors, the controller 110 according to an exemplary embodiment may update the display data of the behavior flow list such that sub-behavior objects corresponding to the sub-behaviors are stepwisely displayed along with a behavior object.

Figure 4A:
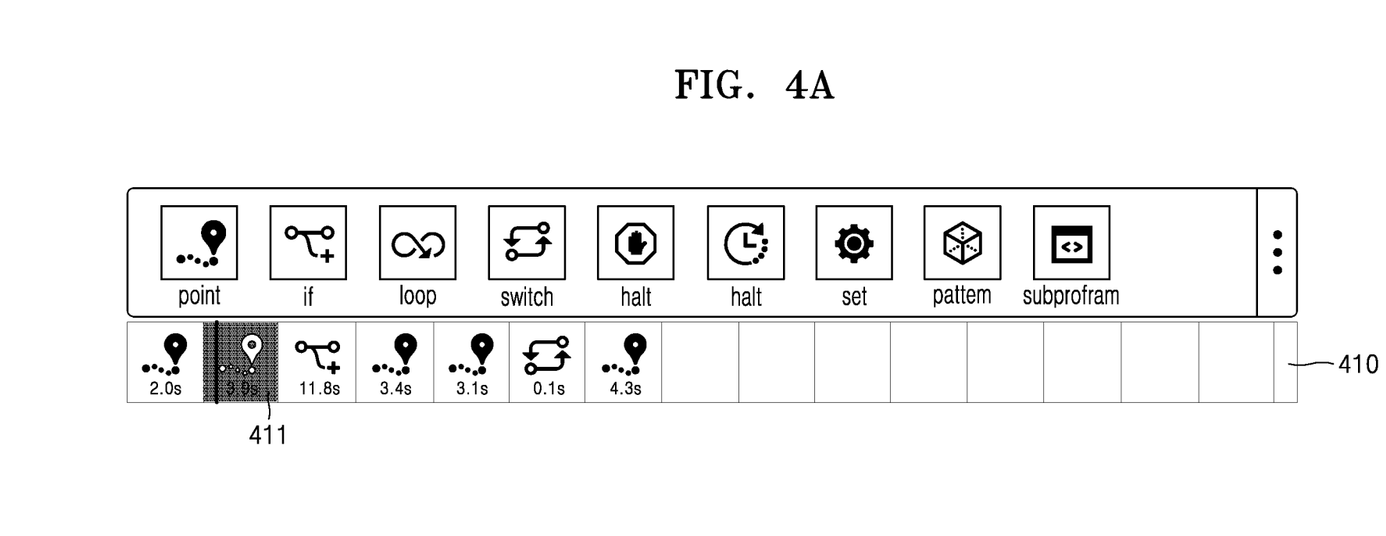
FIGS. 4A through 4C are views for explaining a process performed by the robot to update display data of behavior lists displayed on the display when a behavior including sub-behaviors is performed, according to exemplary embodiments.
Figure 4B:
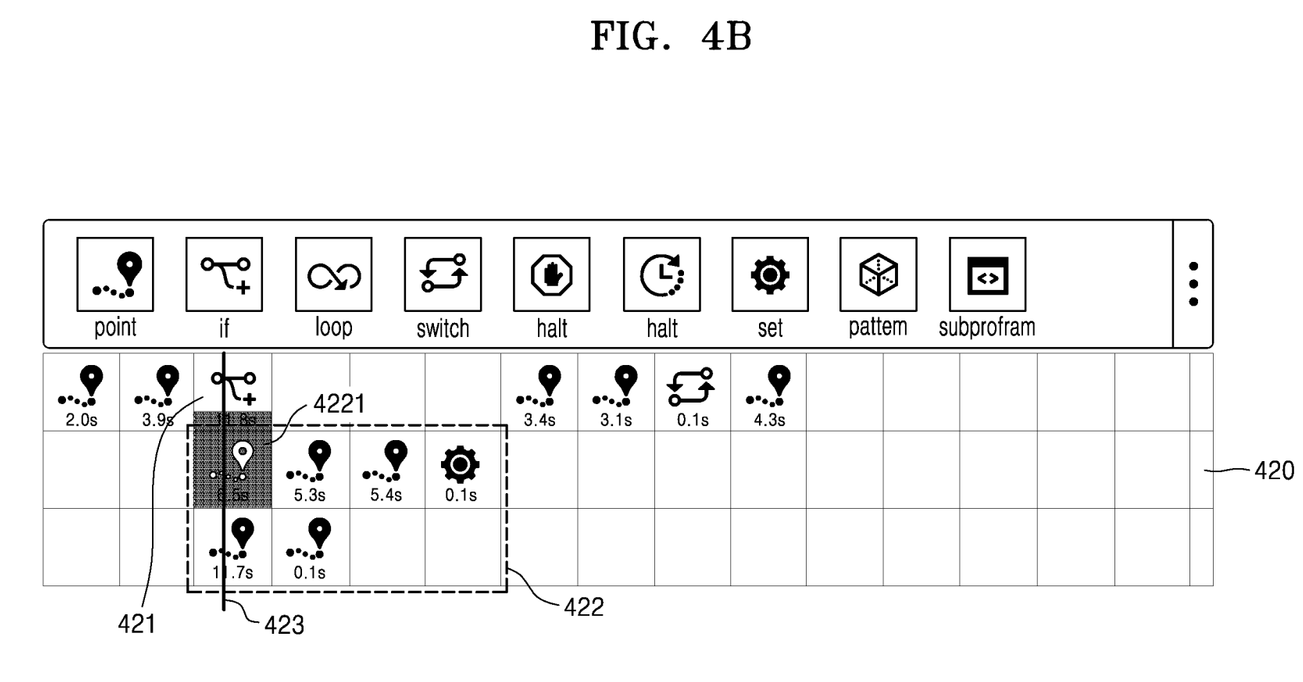
Figure 4C:
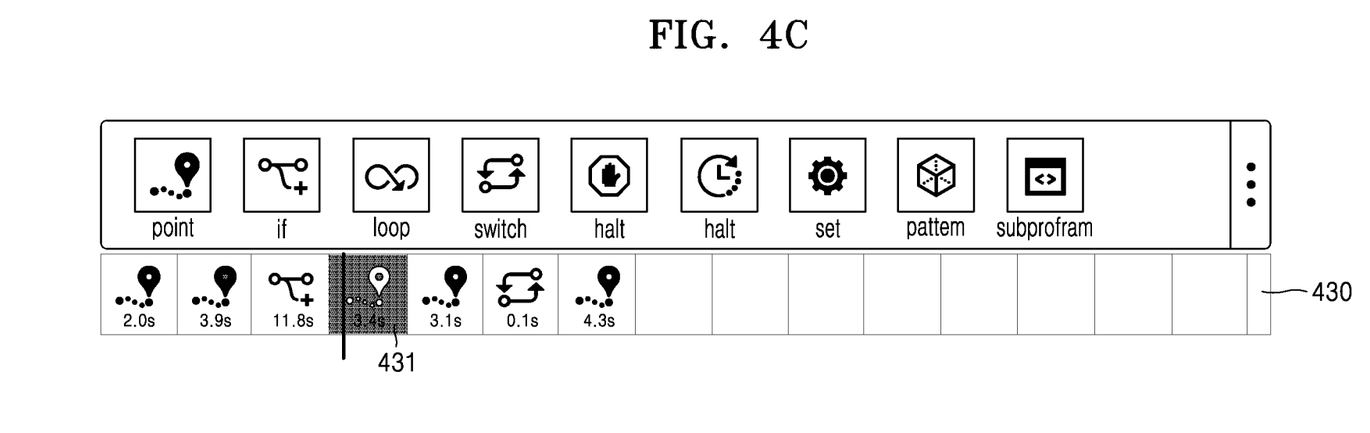

FIGS. 4A through 4C are views for explaining a process performed by the robot 200 to update display data of behavior flow list s 410, 420, and 430 displayed on the display 120 when a behavior including sub-behaviors is performed, according to exemplary embodiments.

For example, it is assumed that the robot 200 is performing a behavior corresponding to a behavior object 411 included in the behavior flow list 410 as shown in FIG. 4A, and the robot 200 performs a behavior corresponding to a behavior object 421 as shown in FIG. 4B and performs a behavior corresponding to a behavior object 431 as shown in FIG. 4C as time passes. Also, it is assumed that the behavior corresponding to the behavior object 421 includes one or more sub-behaviors.

Referring to FIG. 4B, the controller 110 according to an exemplary embodiment may update display data of the behavior flow list 420 such that sub-behavior objects 422 respectively corresponding to the one or more sub-behaviors are stepwisely displayed along with the behavior object 421. Also, the controller 110 may update the display data of the behavior flow list 420 such that behavior objects after the behavior object 421 are displayed after being moved by the number of the sub-behavior objects 422 as shown in FIG. 4B.

Even in this case, the controller 110 may update the display data such that display data of a progress bar 423 corresponding to a progress degree of the behavior of the robot 200 is further included in the display data of the behavior flow list 420 as described above.

Also, the controller 110 may update the display data such that a sub-behavior object 4221 corresponding to a sub-behavior that is being currently performed is displayed according to a first display format and sub-behavior objects corresponding to sub-behaviors other than the sub-behavior object 4221 displayed according to the first display format are displayed according to a second display format. In this case, the controller 110 may update the display data of the behavior flow list 420 such that the behavior object 421 corresponding to the behavior that is being currently performed is displayed according to a third display format. The first display format, the second display format, and the third display format may be different from one another.

Referring to FIG. 4C, when the behavior including the sub-behaviors performed by the robot 200 ends, the controller 110 according to an exemplary embodiment may update display data of the behavior flow list 430 such that the sub-behavior objects 422 corresponding to the sub-behaviors are deleted.

As such, according to the exemplary embodiments, the controller 110 may provide a screen on which a sub-behavior is displayed or not displayed according to needs so that a main behavior is displayed to be highlighted and the sub-behavior that is necessary is displayed without being missed may be provided.

The controller 110 according to an exemplary embodiment may measure an actual time actually taken by the robot 200 to perform a behavior corresponding to a behavior object included in a behavior flow list. Also, the controller 110 may update an expected time mapped to the behavior object to the measured actual time.

The controller 110 according to an exemplary embodiment may update display data of the behavior flow list such that at least one from among the expected time and the actual time is displayed along with one or more behavior objects included in the behavior flow list.

Figure 5:
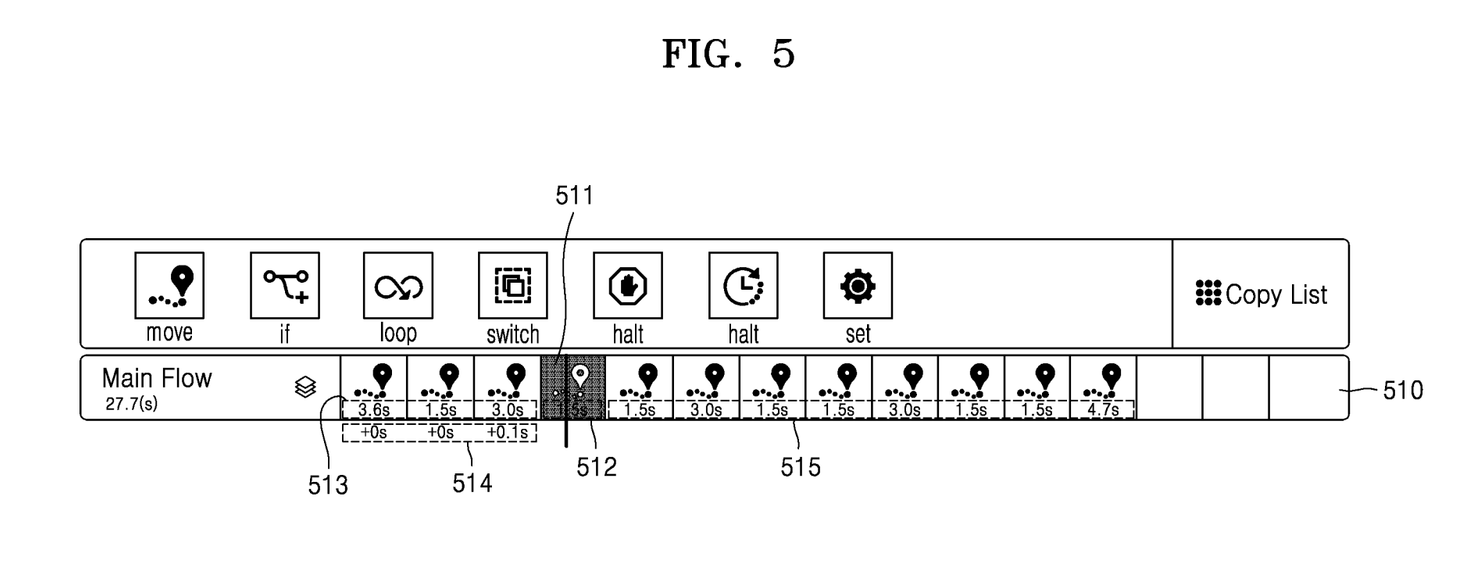
FIG. 5 is a view illustrating an expected time and an actual time displayed on the display when the robot performs a behavior, according to an exemplary embodiment.

FIG. 5 is a view illustrating an expected time and an actual time displayed on the display 120 when the robot 200 performs a behavior, according to an exemplary embodiment.

For example, it is assumed that the robot 200 is performing a behavior corresponding to a behavior object 511 as shown in FIG. 5. That is, it is assumed that behaviors corresponding to behavior objects located at the left of the behavior object 511 in a behavior flow list 510 are behaviors that have already been completed by the robot 200 and behaviors corresponding to behavior objects located at the right of the behavior object 511 are behaviors that are not performed by the robot 200 yet.

In this case, the controller 110 according to an exemplary embodiment may update display data of the behavior flow list 510 such that an expected time 513 of a behavior that has already been completed and a difference 514 between the expected time 513 and an actual time are displayed. Since a behavior that is being currently performed is not completed, an expected time 512 may be displayed, and similarly, an expected time 515 of a behavior that is to be performed may be displayed.

Although the expected time 513 and the difference 514 between the expected time 513 and the actual time are displayed on a screen in FIG. 5, exemplary embodiments are not limited thereto. Accordingly, the actual time may also be displayed along with the expected time 513.

Figure 6:
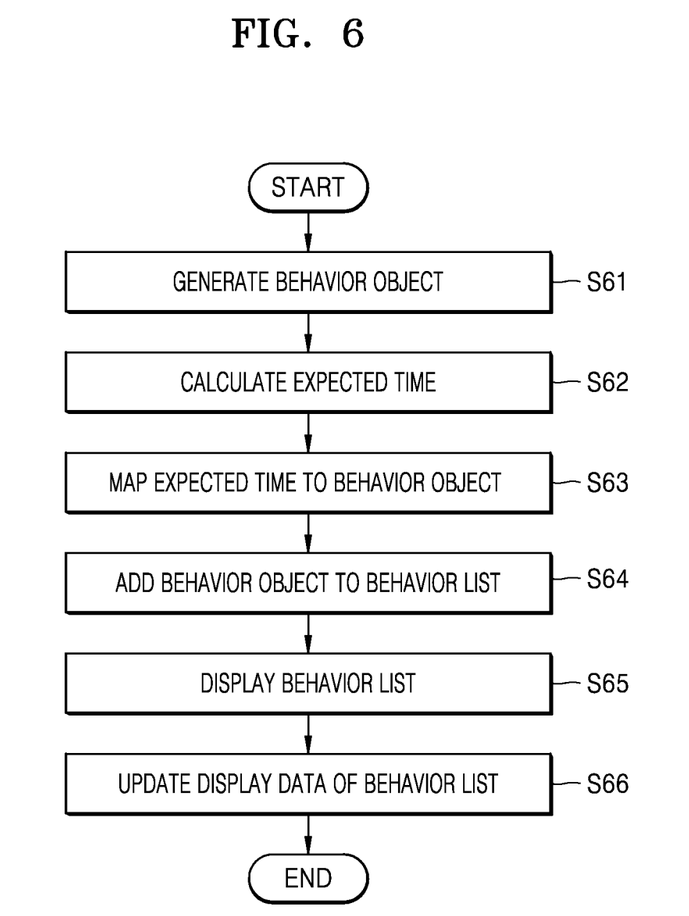
FIG. 6 is a flowchart of a method of managing a behavior performed by an apparatus for managing a behavior of FIG. 1 according to an embodiment.

FIG. 6 is a flowchart of a method of managing a behavior of a robot performed by the apparatus 100 of FIG. 1, according to an exemplary embodiment. Accordingly, the same description as that made with reference to FIGS. 1 through 5 will not be given.

In operation S61, the controller 110 according to an exemplary embodiment may generate a behavior object corresponding to a behavior of the robot 200.

In this case, the controller 110 may generate a behavior object based on a user's input through the input interface 130. Also, the controller 110 may generate one or more behavior objects by referring to a series of instruction codes.

Referring back to FIG. 2A, it is assumed that the screen 200A is displayed on the display 120. In this case, the screen 200A may include the area 210 in which behavior objects corresponding to behaviors that may be input by the user or preset in the apparatus 100 for managing a behavior of the robot 200 are displayed, the area 220 in which the behavior objects 221 through 225 corresponding to behaviors selected by the user are sequentially displayed, the area 230 in which an interface for setting or changing a specific value of a selected behavior object is displayed, and the area 240 in which a 3D image of the robot 200 corresponding to a behavior is displayed.

For example, when it is assumed that the user is to add the behavior object 211 to the area 220, the user may add the behavior object 225 to the area 220 by selecting the behavior object 211 to be added from the area 210 through the input interface 130, and dragging the selected behavior object 211 to the area 220. In other words, the behavior object 225 corresponding to a behavior of the robot 200 may be generated by dragging the behavior object 211, from among behavior objects that are provided as examples, to the area 220. In this case, the user may set or change a specific set value of the selected behavior object 225 through the interface displayed in the area 230.

As such, according to an exemplary embodiment, the user may conveniently and intuitively edit sequential behaviors of the robot 200 through a GUI.

Referring back to FIG. 2B, it is assumed that the screen 200B is displayed on the display 120. In this case, the screen 200B may include the area 250 in which one or more behavior objects generated by instruction codes are sequentially displayed, the area 260 in which the instruction codes are displayed, and the area 270 in which a 3D image of the robot 200 corresponding to a behavior is displayed.

As such, according to an exemplary embodiment, a behavior of the robot 200 made by using instruction codes may also be visualized.

In operation S62, the controller 110 according to an exemplary embodiment may calculate an expected time expected to be taken by the robot 200 to perform each behavior.

For example, the controller 110 may calculate an expected time based on at least one from among an operation speed, an operation acceleration, an operation distance, an operation path, an operation radius, a delay time, and an operation environment of each behavior, not being limited thereto.

The expected time calculated by the controller 110 is literally a time "expected" to be taken by the robot 200 to perform a behavior, and is not a time actually taken by the robot 200 to perform the behavior. However, the expected time may be updated to an actual time actually taken by the robot 200 to perform the behavior, which will be described below.

In operation S63, the controller 110 may map the expected time of each behavior calculated according to the above method to the behavior object corresponding to the behavior.

In other words, the controller 110 may control the behavior object of the behavior to correspond to the expected time of the behavior. The expected time corresponding to the behavior object may be displayed along with the behavior object on the display 120 as described below.

In operation S64, the controller 110 according to an exemplary embodiment may add the generated behavior object to a behavior flow list.

In the present disclosure, when "the behavior object is added to the behavior flow list", it may mean that the robot 200 is to perform the behavior at a point of time considering a relative time relationship with one or more other behaviors.

For example, referring back to FIG. 2A, the user may add the behavior object 225 to the area 220, that is, to the behavior flow list, so that the robot 200 is to perform a behavior corresponding to the added behavior object 225 at the end.

The controller 110 according to an exemplary embodiment may generate display data of the behavior flow list, and the display 120 may display the behavior flow list based on the generated display data.

In operation S65, the controller 110 according to an exemplary embodiment may generate display data of the behavior flow list, and may display the behavior flow list based on the generated display data.

Also, in operation S66, when the robot 200 performs a behavior based on the behavior flow list, the controller 110 according to an exemplary embodiment may update the display data of the behavior flow list based on a progress degree of the behavior of the robot 200.

Since the detailed operations or functions for updating the display data of the behavior flow list have already been described above, duplicate descriptions thereof are not be additionally provided below.

According to the one or more exemplary embodiments, a method and apparatus for managing a behavior of a robot that may be able to provide a user with collective visual information about which behavior is being currently performed from all behaviors of the robot and how far the behavior that is being currently performed has progressed.

Also, a method and apparatus for managing a behavior of a robot that may conveniently and intuitively edit sequential behaviors of the robot through a GUI may be provided, according to the exemplary embodiments.

Also, a method and apparatus for managing a behavior of a robot may provide a screen on which a sub-behavior is displayed or not displayed according to needs so that a main behavior is displayed to be highlighted and the sub-behavior that is necessary is displayed without being missed may be provided, according to the exemplary embodiments.

The above-described methods may also be embodied as computer-readable codes on a computer-readable recording medium. The computer-readable recording medium is any data storage device that may store data which may thereafter be read by a computer system. Examples of the computer-readable recording medium include read-only memory (ROM), random-access memory (RAM), CD-ROMs, magnetic tapes, floppy disks, optical data storage devices, etc. The computer-readable recording medium may also be distributed over network coupled computer systems so that the computer-readable code is stored and executed in a distributive manner. Also, functional programs, codes, and code segments for accomplishing the present disclosure may be easily construed by programmers skilled in the art to which the present disclosure pertains.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A method of controlling a robot, the method comprising:

generating a plurality of behavior objects corresponding to a plurality of behaviors to be performed by the robot, respectively;
adding the behavior objects to a behavior flow list;
displaying the behavior flow list on a display device; and
based on a progress degree of the robot performing the plurality of behaviors on the behavior flow list, updating the displaying of the behavior flow list on the display device.

2. The method of claim 1, wherein the updating the displaying of the behavior flow list further comprises displaying a progress bar corresponding to the progress degree on the displayed behavior flow list.

3. The method of claim 1, wherein at least one of the behaviors comprises one or more sub-behaviors,
wherein the generating the plurality of behavior objects further comprises generating a sub-behavior object corresponding to each of the one or more sub-behaviors, and
wherein the adding the behavior objects to the behavior flow list further comprises adding the sub-behavior object corresponding to each of the one or more sub-behaviors to the behavior flow list.

4. The method of claim 3, wherein the updating the displaying of the behavior flow list further comprises:
determining, based on the progress degree, whether a current behavior that is being currently performed comprises sub-behaviors; and
based on the determining that the current behavior comprises the sub-behaviors, displaying sub-behavior objects corresponding to the sub-behaviors along with a behavior object of the current behavior.

5. The method of claim 4, wherein the displaying sub-behavior objects comprises:
displaying the sub-behavior object corresponding to a current sub-behavior that is being currently performed according to a first display format; and
displaying the sub-behavior objects other than the sub-behavior object corresponding to the current sub-behavior according to a second display format.

6. The method of claim 5, wherein the behavior object corresponding to the current behavior is displayed according to a third display format.

7. The method of claim 4, wherein the updating the displaying of the behavior flow list further comprises deleting the sub-behavior objects corresponding to the sub-behaviors of the current behavior when the current behavior ends.

8. The method of claim 1, wherein the generating the plurality of behavior objects further comprises selecting the behavior objects based on a user's input from a list of behavior objects available in a system to control the robot.

9. The method of claim 1, further comprising:
calculating an expected time expected to be taken by the robot to perform each of the behaviors; and
mapping each of the behavior objects to the expected time for the displaying.

10. The method of claim 9, wherein at least one of the behaviors comprises one or more sub-behaviors,
wherein the generating the plurality of behavior objects further comprises generating a sub-behavior object corresponding to each of the one or more sub-behaviors, and
wherein the calculating the expected time further comprises calculating an expected time expected to be taken to perform each of the one or more sub-behaviors.

11. The method of claim 9, wherein the updating the displaying of the behavior flow list further comprises:
measuring an actual time actually taken by the robot to perform a behavior corresponding to a behavior object included in the behavior flow list; and
updating the expected time mapped to the behavior object to the actual time.

12. The method of claim 11, wherein the updating the displaying of the behavior flow list further comprises displaying at least one of the expected time and the actual time along with the behavior objects included in the behavior flow list.

13. An apparatus for controlling a robot, the apparatus comprising:
a display device;
a controller comprising at least one processor configured to:
generate a plurality of behavior objects corresponding to a plurality of behaviors to be performed by the robot, respectively;
add the behavior objects to a behavior flow list;
generate display data of the behavior flow list; and
based on a progress degree of the robot performing the plurality of behaviors on the behavior flow list, update the displaying of the behavior flow list on the display device.

14. The apparatus of claim 13, wherein at least one of the behaviors comprises one or more sub-behaviors, and the controller is further configured to:
generate a sub-behavior object corresponding to each of the one or more sub-behaviors; and
add the sub-behavior object corresponding to each of the one or more sub-behaviors to the behavior flow list.

15. The apparatus of claim 14, wherein the controller is further configured to:
determine, based on the progress degree, whether a current behavior that is being currently performed comprises sub-behaviors; and
based on the determining that the current behavior comprises the sub-behaviors, update the display data of the behavior flow list so that sub-behavior objects corresponding to the sub-behaviors are displayed along with a behavior object of the current behavior.

16. The apparatus of claim 13, wherein the controller is further configured to calculate an expected time expected to be taken by the robot to perform each of the behaviors, and map each of the behavior objects to the expected time for display.

17. The apparatus of claim 16, wherein at least one of the behaviors comprises one or more sub-behaviors, and
wherein the controller is further configured to generate a sub-behavior object corresponding to each of the one or more sub-behaviors, and calculate an expected time expected to be taken to perform each of the one or more sub-behaviors.

18. The apparatus of claim 16, wherein the controller is further configured to measure an actual time actually taken by the robot to perform a behavior corresponding to the behavior object included in the behavior flow list, and update the expected time mapped to the behavior object to the actual time.

* * * * *